United States Patent
Newbury et al.

(10) Patent No.: US 9,596,575 B2
(45) Date of Patent: Mar. 14, 2017

(54) SYSTEM AND METHOD FOR LOCALIZATION AND TRAFFIC DENSITY ESTIMATION VIA SEGMENTATION AND CALIBRATION SAMPLING

(71) Applicant: FutureWei Technologies, Inc., Plano, TX (US)

(72) Inventors: Mark Newbury, Hillsborough, NJ (US); Iyad Alfalujah, Neshanic Station, NJ (US); Suman Das, Colonia, NJ (US); Kamalaharan Dushyanthan, Metuchen, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 68 days.

(21) Appl. No.: 14/079,838

(22) Filed: Nov. 14, 2013

(65) Prior Publication Data

US 2015/0133159 A1   May 14, 2015

(51) Int. Cl.
*H04W 4/02* (2009.01)
*H04W 4/04* (2009.01)
(Continued)

(52) U.S. Cl.
CPC ........... *H04W 4/043* (2013.01); *G01S 5/0252* (2013.01); *H04W 4/02* (2013.01); *H04W 64/006* (2013.01); *H04W 24/08* (2013.01); *H04W 24/10* (2013.01)

(58) Field of Classification Search
CPC ....... H04W 4/02; H04W 64/00; H04W 4/021; H04W 4/023; H04W 4/028; H04W 64/003;
(Continued)

(56) References Cited

U.S. PATENT DOCUMENTS 6,313,786 B1 * 11/2001 Sheynblat et al. ....... 342/357.23
8,532,676 B1    9/2013 El-Sallabi
(Continued)

FOREIGN PATENT DOCUMENTS

| CN | 101292563 A | 10/2008 |
| JP | 2010127843 A | 6/2010 |
| WO | 2013065042 A1 | 5/2013 |

OTHER PUBLICATIONS

International Search Report and Written Opinion received in International Application No. PCT/CN2014/091088, mailed Feb. 17, 2015, 11 Pages.
(Continued)

Primary Examiner — Magdi Elhag
(74) Attorney, Agent, or Firm — Slater Matsil, LLP

(57) ABSTRACT

Embodiments are provided for calibration, preprocessing, and segmentation for user localization and network traffic density estimation. The embodiments include sending, from a network component, a request to a plurality of user equipment (UEs) to participate in reporting localization data. Reports for localization data including no-lock reports are received from at least some of the UEs. The no-lock reports indicate indoor UEs among the UEs. The network preprocesses the localization data by eliminating, from the localization data, data that increases the total noise to signal ratio. The localization data is then processed using a model that distinguishes between different buildings. This includes associating, according to a radio map, radio characteristics in the localization data with corresponding bins in a non-uniform grid of coverage. The non-uniform grid is predetermined to maximize uniqueness between the radio characteristics. The indoor UEs are associated with corresponding buildings using the no-lock reports data.

14 Claims, 2 Drawing Sheets

(51) Int. Cl.
  *H04W 64/00* (2009.01)
  *G01S 5/02* (2010.01)
  *H04W 24/08* (2009.01)
  *H04W 24/10* (2009.01)

(58) Field of Classification Search
  CPC ....... H04W 4/04; H04W 4/043; H04W 4/025;
  H04W 64/006; G01S 5/0252; G01S 5/02;
  G01S 5/06; G01S 5/0215
  USPC ............................................ 455/456.1–456.6
  See application file for complete search history.

(56) References Cited

U.S. PATENT DOCUMENTS

| | | | | |
|---|---|---|---|---|
| 2006/0089160 A1* | 4/2006 | Othmer | ........................ | 455/457 |
| 2007/0049295 A1 | 3/2007 | Soliman et al. | | |
| 2011/0102256 A1* | 5/2011 | Shen et al. | ............... | 342/357.31 |
| 2011/0298658 A1* | 12/2011 | Riley | .................... | G01S 5/0236 |
| | | | | 342/357.26 |
| 2013/0103290 A1* | 4/2013 | Hardin | .................. | G01C 21/20 |
| | | | | 701/117 |
| 2014/0279053 A1* | 9/2014 | Lee | ........................... | 705/14.71 |

OTHER PUBLICATIONS

Mike Y. Chen et al.: "Practical Metropolitan-Scale Positioning for GSM Phones", Jan. 1, 2006, UBICOMP 2006: Ubiquitous Computing Lecture Notes in Computer Scientce; LNCS, Springer, Berlin, DE, pp. 225-242, XP019040474, ISBN: 978-3-540-39634-5.

Alex Varshavsky, et al.: "Calibration-Free Localization Using Relative Distance Estimations", May 19, 2008, Pervasive Computing, (Lecture Notes in Computer Science), Springer Berlin Heidelberg, Berlin, Heielberg, pp. 146-161, XP019110799, ISBN: 978-3-540-79575-9.

* cited by examiner

SYSTEM AND METHOD FOR LOCALIZATION AND TRAFFIC DENSITY ESTIMATION VIA SEGMENTATION AND CALIBRATION SAMPLING

TECHNICAL FIELD

The present invention relates generally to a system and method for wireless technology, and, in particular embodiments, to a system and method for user localization and traffic density estimation via segmentation and calibration sampling.

BACKGROUND

The ability to localize users as well as to construct spatial traffic densities can significantly enhance a wireless service provider's (WSP's) ability to service its users and intelligently expand their network. For example, the ability to localize a wireless device enables a variety of Location-Based Services (LBS), including 911, maps, weather, nearby shops, directions, gaming, or other services. Knowledge of high-resolution spatial traffic densities can also be used to cost-effectively place new cells as well as provide important general insight about subscriber behavior. One approach for user localization or traffic density estimation is the use of a GPS (Global Positioning Satellite) system, which requires specialized device receivers not available in all mobile devices. Moreover, GPS does not work deep indoors where there is no visibility to the satellite constellation. The use of GPS also raises concerns about device battery life and network signaling overload. Similar difficulties arise in the construction of traffic densities (e.g., average users/area). These are usually derived by aggregating individual localizations over time within a grid of small areas (bins'). If based on GPS, these densities are inaccurate because the available localizations do not include important subsets of the subscriber population, such as indoor users or outdoor users without GPS receivers.

Another approach is radio fingerprinting, which bypasses some of the above difficulties but suffers from other issues. In fingerprinting, the area is first calibrated by creating a radio map of the service area that associates each (or most) locations with its radio characteristics or fingerprint. This map is assembled through field measurements typically taken via extensive walk or drive test. A typical fingerprint consists of the strength and identity of control channels as seen from surrounding cell site transmitters. Other information such as Round Trip Time (RTT) delay may be included but is not always available. After calibration, routine reports of radio characteristics from commercial mobile devices can be used to dictate a location by associating the report with the most similar fingerprint on the radio map. This process bypasses reliance on GPS but suffers from difficulties such as the expense involved in calibration (it is difficult to take measurements inside all buildings) and reduced accuracy (different locations may have similar or even identical fingerprints). Therefore, there is a need for a scheme with improved calibration (training) and improved accuracy for traffic density estimation and localization.

SUMMARY OF THE INVENTION

In accordance with an embodiment, a method for traffic density estimation and user localization includes sending, from a network component, a request to a plurality of user equipment (UEs) to participate in reporting localization data, and receiving from at least some of the UEs a plurality of reports for localization data including no-lock reports. The no-lock reports indicate indoor UEs among the UEs. The method further includes preprocessing the localization data by eliminating, from the localization data, data increasing total noise to signal ratio. After preprocessing the localization data, the localization data is processed using a model that distinguishes between different buildings. The indoor UEs are associated with corresponding buildings using the localization data of the no-lock reports.

In accordance with another embodiment, a method for traffic density estimation and user localization includes receiving, at a UE from a network, a request to participate in reporting data for localization. Upon accepting of the request, the UE generates a report of the data. The report is a no-satellite-lock report that indicates that the UE is located inside a building, distinguishes the UE from other UEs located outdoors, and allows the network to place the UE in the building without modeling a shape of the building and without using indoor location details. The method further includes storing the report locally at the UE, and upon determining a relatively low network load time, sending the report to the network.

In accordance with another embodiment, a network component for traffic density estimation and user localization includes a processor and a computer readable storage medium storing programming for execution by the processor. The programming includes instructions to send a request to a plurality of UEs to participate in reporting localization data, and receive from at least some of the UEs a plurality of reports for localization data including no-lock reports. The no-lock reports indicate indoor UEs among the UEs. The programming includes further instructions to preprocess the localization data by eliminating, from the localization data, data increasing total noise to signal ratio. After preprocessing the localization data, the programming configures the network component to process the localization data using a model that distinguishes between different buildings, and associate the indoor UEs with corresponding buildings using the localization data of the no-lock reports.

In accordance with yet another embodiment, a user device supporting traffic density estimation and user localization includes a processor and a computer readable storage medium storing programming for execution by the processor. The programming includes instructions to receive, from a network, a request to participate in reporting data for localization, and upon acceptance of the request, generate a report of the data. The report is a no-satellite-lock report that indicates that the user device is located inside a building, distinguishes the user device from other user devices located outdoors, and allows the network to place the UE in the building without modeling a shape of the building and without using indoor location details. The user device is further configured to store the report locally at the user device and upon determining a relatively low network load time, send the report to the network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The practical difficulty of calibration before preprocessing and segmentation for user localization and density estimation should not be underestimated. Calibration, also referred to herein as 'training', may require a spatially dense set of field measurements across the entire area of interest. Different locations may be measured, including inside and outside buildings. The expense and feasibility of this exercise is challenging. Alternatively, a sparse set of field measurements may be used to tune a radio model that predicts fingerprints within locations that cannot be measured. However, the accuracy required for this approach may be unrealistic or prohibitively expensive, such as for predicting calibration data from inside buildings. The need for calibration inside buildings can be obviated by localizing in-building mobile devices directly through their proximity to known low power transmitters within each structure, but widespread deployment of such transmitters would be required. Furthermore, any difficulties with calibration are increased by the need to periodically repeat the process, since radio characteristics of the area may change with time.

Embodiments are provided herein for calibration and preprocessing and segmentation for the purpose of device or user localization and (wireless) traffic density estimation. The embodiments include an approach that bypasses the difficulties above through exploiting less use of GPS and utilizing lower accuracy (relaxed) radio modeling, e.g., in a limited or less involved or demanding manner. The approach improves accuracy of localization and traffic density estimation, significantly reduces the cost of calibration, and localizes outdoor and indoor users regardless of GPS availability within the device.

Figure 1:
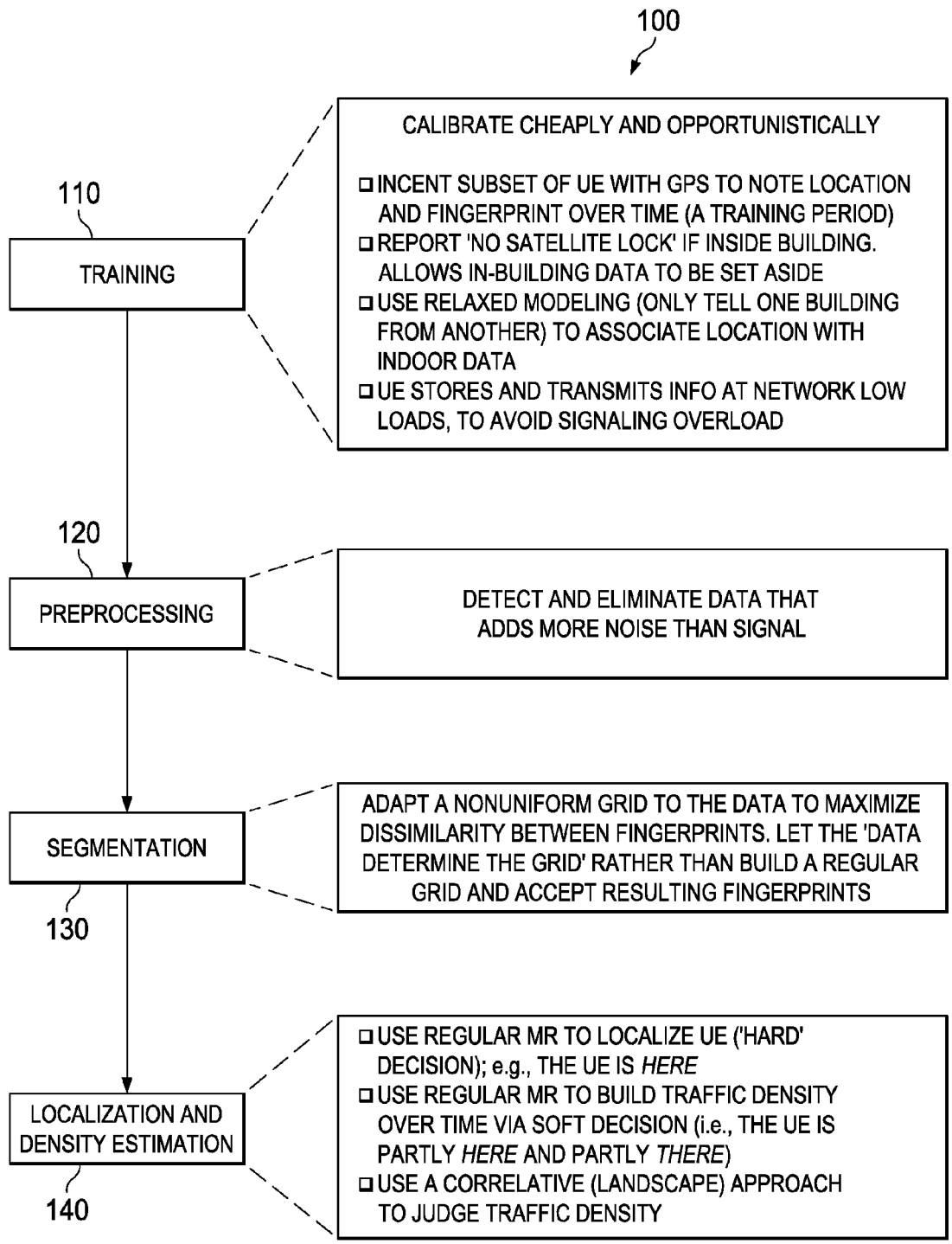
FIG. 1 illustrates an embodiment of an overall (end-to-end) scheme for calibration (training) and preprocessing and segmentation for traffic density estimation and user localization.

FIG. 1 shows an embodiment of a scheme 100 for calibration (training) and segmentation for traffic density estimation and user localization. The scheme 100 comprises a plurality of steps, including training 110, pre-processing 120, segmentation 130, and localization and density estimation 140. Training (or calibration) 110, pre-processing 120, and segmentation 130 can be used to build a database that is then used for localizing mobile devices in the network and constructing traffic density (step 140), for example, using a fingerprinting-based approach.

At step 110, training data can be obtained relatively cheaply (at relatively low cost) and opportunistically through incenting a subset of wireless subscribers (mobile devices) equipped with GPS capability to indicate their location and radio fingerprint. The subset of mobile devices can be incented via a prompt on the device, for example during a download of an application or media. The user may be offered a free download, registration, or service for participating in the process. Signaling overload from the devices can be avoided by storing the information within the devices and subsequently transmitting the information at times of low network load. In-building calibration is accomplished by using a GPS 'no-lock' report to set aside or distinguish a class of data that is in-building. A relaxed building modeling (with relatively low complexity) can be used to attribute this data to the corresponding building(s). The pre-processing step 120 is then used to detect and eliminate training data that adds more error than information. This can be done by removing data with high noise (e.g., above a threshold) and/or applying a suitable noise filtering technique on the collected training data. For instance, a noise threshold of 10% may be used, where data with noise levels higher than 10% noise to signal are eliminated.

After preprocessing, at step 130, a radio map is built by producing a database that associates each pre-determined segmentation area (bin) with a set of radio characteristics ('fingerprint'). Localization and density accuracy is limited by the similarity between bin fingerprints. In a typically segmentation process, bin grids are pre-established and fingerprints are noted, in other words, the grid determines the data. However, in the calibration and segmentation scheme 100, a non-uniform grid to the coverage area is used to maximize uniqueness between fingerprints, in other words, the data determines the grid.

At step 140, with the radio map complete, routine reports of radio characteristics (e.g., identity and strength of pilots) from wireless devices can be used to localize users and to build traffic densities. Typically, localization can be described as a 'hard' decision in the sense that it identifies whether a device is 'here' or 'not here' (with respect to a bin). Traffic densities are built by aggregating localizations within bins, and are assessed via accuracy of the localization information. However, in the scheme 100, traffic density is built using a 'soft' decision approach where parts of the devices or user equipment (UEs) can be identified as 'here' as well as 'there'. Further, the accuracy of the result is assessed via a correlation metric that measures a traffic density 'landscape' (with respect to a group of bins). More details about the steps for pre-processing 120, segmentation 130, and localization and density estimation are described in U.S. Patent Application No. 61/780,328 filed Mar. 13, 2013 by Iyad Alfalujah et al. and entitled "System and Method for Localizing Wireless Devices," which is incorporated herein by reference as if produced in its entirety.

Other typical localization and density estimation schemes, which employ some form of radio fingerprinting, may use extensive drive and walk testing (referred to as war driving) to gather sufficient data for calibration. Such approaches may also bypass building access issues by using high accuracy radio models to generate artificial calibration data for the area inside buildings. These approaches may also requires ongoing or regular transmission of GPS reports from mobile devices (if GPS is used), resulting in signaling overload issues. These approaches also use all data collected in the calibration process. A pre-determined or standard (e.g., uniform) grid is also used to dictate bin fingerprints (the grid dictates the data). The traffic density is hence constructed by aggregating hard localization decisions and the accuracy of this density is assessed through the statistics of the hard localization data, as described above.

In contrast, the scheme 100 uses GPS information from a statistically significant sample of subscriber population to do calibration, e.g., a subset of incentivized users or devices, without using war driving, which leads to substantial reduction in cost and complexity. The scheme 100 bypasses building access issues by using 'no GPS lock' labels for pilot reports from UEs inside buildings. These non-artificial (real) reports are then assigned to the correct buildings by using low accuracy in-building modeling techniques, which may only require distinguishing one building (or group of buildings) from another. In contrast, the use of models to generate artificial calibration data for inside buildings as described as described above for typical localization and density estimation schemes requires high or even prohibitive accuracy. Further, the scheme 100 requires temporary or irregular transmission of GPS reports from devices for calibration. Signal overload issues are mitigated by the brevity of data collection period as well as by the transmission of stored data at the UE to the network at times of low network load (low network traffic times). A subset of the collected data is then used in the calibration process, wherein the data that contributes more 'noise' than 'signal' are discarded. As described above, an irregular or adapted grid formation is used in the segmentation process. The grid is customized to the calibration data to maximize the uniqueness of fingerprints between the different bins (the data determines the grid). Another improvement of the scheme 100 is using a soft decision process that does not require hard localizations, and assessing the accuracy of this density through a correlation procedure (e.g., using correlations to assess the accuracy of the spatial 'landscape' of traffic density estimates).

Figure 2:
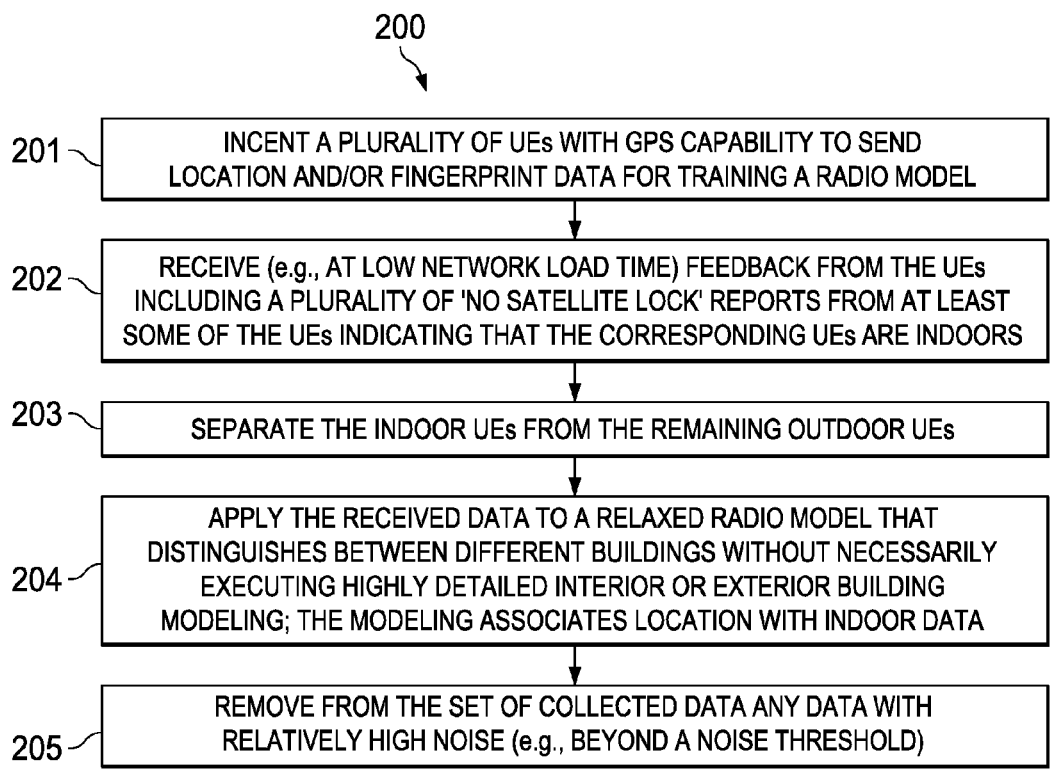
FIG. 2 illustrates a flowchart of an embodiment of a calibration (or training) method for traffic density estimation and user localization.

FIG. 2 shows an embodiment of a method 200 for calibration (training) for the purpose of traffic density estimation and device or user localization. For instance, the method 200 may be part of the scheme 100, e.g., as part of the calibration or training step 110. The method 200 may be implemented by a component in the network, such as a controller, a server, or a base station that communicates with a plurality of UEs. At step 201, a plurality of UEs with GPS capability are incentivized to send location and/or fingerprint data for training a radio model. At least some of the UEs may accept to participate and send their data. At step 202, the network receives feedback from the UEs including a plurality of 'no satellite lock' reports from at least some of the UEs indicating that the corresponding UEs are indoors. By default, other reports may indicate outdoor UEs. The UEs may be configured or instructed to temporary locally store the generated reports and then send the reports during low network load times, which may be pre-determined. At step 203, the network separates the indoor UEs (with 'no satellite lock' reports) from the remaining outdoor UEs. At step 204, the received data is applied to a relaxed radio model that distinguishes between different buildings without necessarily executing highly or more detailed interior or exterior building modeling. The modeling associates location with indoor data. This means that the model is capable of placing the indoor UEs in their corresponding building locations with sufficient accuracy, without necessarily modeling the shape or UEs indoor location details. At step 205, the network (modeling) component removes from the set of collected data any data with relatively high noise (e.g., beyond a noise threshold). Subsequently, the model can be passed to a segmentation process (e.g., the step 130).

Advantages of obtaining training data in scheme 100 and method 200 include the relatively low cost of implementation due to the opportunistic use of subscribers with GPS embedded wireless devices, e.g., in comparison to hiring an group of personnel to conduct extensive field measurements. The training approach herein is more effective since it obviates the difficulty of field personnel getting into buildings, creates a richer (denser) set of field samples, and skews data collection towards areas naturally more frequented (populated') by wireless users. This last advantage means that errors are less likely in popular areas (e.g., more traffic density) and more likely in 'unpopular' areas (e.g., less traffic density), where accuracy is typically less important. In contrast, a field sampling of the area would be uniform and effectively treat popular and unpopular areas with equal importance. In addition, issues commonly associated with GPS are circumvented using the scheme 100 and method 200. Privacy issues do not arise because users 'opt in' to the calibration process. Moreover, only a statistically significant subset of users needs to participate to produce the training data needed (e.g., not all subscribers must have GPS, and not all subscribers with GPS need to participate). Further, the approach of 'store and later transmit' bypasses concerns that transmission of GPS location information to the network may cause signaling overload.

The training approach also mitigates issues associated with using modeling to replace or augment field calibration data. Typically, a complete calibration set for a fingerprinting approach is produced by test-driving accessible roadways and then using this data to tune a radio model that produces artificial (modeled) field data for all non-accessible locations, such as minor roadways, sidewalks, in-building, or other locations. This process presents several difficulties. For example, drive testing itself is costly. Moreover, detailed radio modeling requires the purchase of high-resolution cartographic (3-dimensional) data bases for the area of interest. These are expensive and not always available. Even given such information, the accuracy of modeled data, such as for indoor locations, may not be sufficient to replace field data. In contrast, the opportunistic calibration approach herein only need relaxed or less complicated modeling. Sufficiently dense outdoor data is produced to remove the need for outdoor radio modeling in various cases. For remaining cases, the richer data set allows better tuning of any suitable radio model that may be used. Radio modeling is needed for the indoor data set. However, the accuracy requirements are relaxed because the pool of indoor fingerprints is already distinguished from the pool of outdoor fingerprints by the 'no GPS fix' information. To correctly calibrate the buildings, the building models need only accurately determine one building (or group of buildings) from another, as opposed to being sufficiently accurate to distinguish indoor from outdoor locations.

The opportunistic training process is also easily and cheaply repeated as necessary, for instance to accommodate inevitable changes in the radio map (e.g., addition of new cell sites). This ease of repeat magnifies the cost savings. The training approach herein also offers advantages through the remaining three steps: pre-processing, segmentation, and localization and density estimation. The data or context filtering (during pre-processing) improves accuracy by discarding data that is 'too noisy'. The segmentation improves accuracy by adapting a mesh that maximizes uniqueness (dissimilarity) among fingerprints. The soft density estimation improves accuracy by properly accounting for any remaining similarity between bins.

Figure 3:
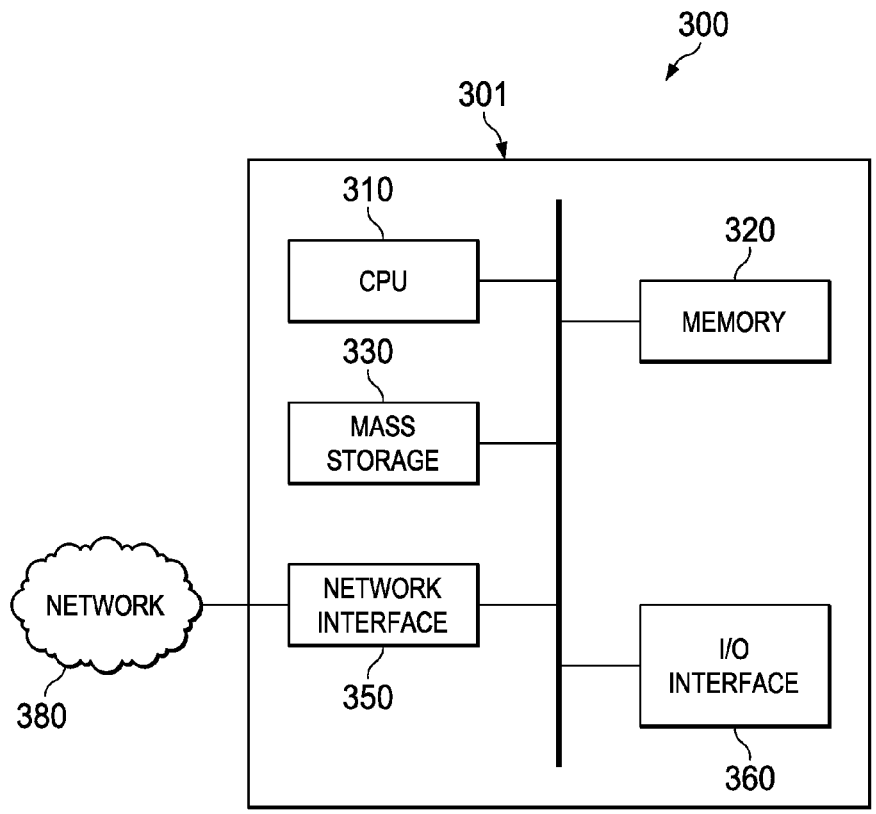
FIG. 3 is a diagram of a processing system that can be used to implement various embodiments.

FIG. 3 is a block diagram of an exemplary processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for traffic density estimation and user localization, the method comprising:
   sending, from a network component, a request to a plurality of user equipment (UEs) to participate in reporting training data, the training data including location and/or fingerprint data;
   receiving, from at least a portion of the plurality of UEs, a plurality of reports for training data including a no-satellite-lock reports and the training data from the at least the portion of the plurality of UEs, wherein the no-satellite-lock reports indicate indoor UEs among the at least the portion of the plurality of UEs;
   discarding at least some of the training data that includes a noise level higher than a pre-determined threshold;
   associating, by the network component, the indoor UEs with corresponding buildings in a service area of the network component in accordance with the training data and the no-satellite-lock report to produce building associations;
   building a radio map in accordance with the training data and the no-satellite-lock report to produce a non-uniform bin grid; and
   using a soft decision approach for performing traffic density estimation, without performing hard localization, in accordance with the radio map, the non-uniform bin grid, and the building associations.

2. The method of claim 1 wherein the non-uniform bin grid represents the service area with the fingerprint data, and wherein the non-uniform bin grid is pre-determined to maximize uniqueness between fingerprints in the non-uniform bin grid.

3. The method of claim 1, wherein the pre-determined threshold is defined as 10% noise to signal ratio.

4. The method of claim 1, wherein the training data comprises Global Positioning Satellite (GPS) system data from GPS capable UEs.

5. The method of claim 1, wherein the training data is received during a pre-determined or indicated relatively low network load time.

6. The method of claim 1 further comprising assessing the estimated traffic density via a correlation metric that measures traffic of UEs with respect to the non-uniform bin grid.

7. The method of claim 1 further comprising sending, from the network component upon demand, one or more requests to the at least the portion of the plurality of UEs to update the training data.

8. The method of claim 1, wherein the method for traffic density estimation and user localization does not include drive and walk testing.

9. The method of claim 1, wherein the training data includes strength and identity of control channels as seen from surrounding cell site transmitters to the at least the portion of the plurality of UEs.

10. The method of claim 1, wherein the fingerprint data includes Round Trip Time (RTT) delays associated with signal channels of the at least the portion of the plurality of UEs.

11. A network component for traffic density estimation and user localization, the network component comprising:
- a processor; and
- a non-transitory computer readable storage medium storing programming for execution by the processor, the programming including instructions to:
  - send a request to a plurality of user equipment (UEs) to participate in reporting localization data;
  - receive, from at least a portion of the plurality of UEs, a plurality of reports for localization data including no-satellite-lock reports and training data indicating attributes of signal channels of the at least the portion of the plurality of UEs, wherein the no-satellite-lock reports indicate indoor UEs among the at least the portion of the plurality of UEs, and wherein the training data includes location and/or fingerprint data;
  - discard at least some of the localization data that includes a noise level higher than a pre-determined threshold;
  - associate the indoor UEs with corresponding buildings in a service area of the network component in accordance with the training data and the no-satellite-lock reports to produce building associations;
  - build a radio map in accordance with the training data and the no-satellite-lock reports to produce a non-uniform bin grid; and
  - use a soft decision approach to perform traffic density estimation, without performing hard localization, in accordance with the radio map, the non-uniform bin grid, and the building associations.

12. The network component of claim 11, wherein the non-uniform bin grid is pre-determined to maximize uniqueness between fingerprints.

13. The network component of claim 11, wherein the localization data comprises Global Positioning Satellite (GPS) system data from GPS capable UEs.

14. The network component of claim 11, wherein the programming includes further instructions to:
- assess the estimated traffic density via a correlation metric that measures traffic of UEs with respect to the non-uniform bin grid.

* * * * *